(12) United States Patent
Mulato et al.

(10) Patent No.: US 10,947,166 B2
(45) Date of Patent: Mar. 16, 2021

(54) METHOD FOR PRODUCING FERTILIZER PARTICLES COMPRISING ALTERNATIVE BORON SOURCES

(71) Applicant: YARA INTERNATIONAL ASA, Oslo (NO)

(72) Inventors: Riccardo Mulato, Venice (IT); Amund Myrstad, Skien (NO)

(73) Assignee: YARA INTERNATIONAL ASA, Oslo (NO)

( * ) Notice: Subject to any disclaimer, the term of this patent is extended or adjusted under 35 U.S.C. 154(b) by 82 days.

(21) Appl. No.: 16/487,589

(22) PCT Filed: Feb. 26, 2018

(86) PCT No.: PCT/EP2018/054607
§ 371 (c)(1),
(2) Date: Aug. 21, 2019

(87) PCT Pub. No.: WO2018/154089
PCT Pub. Date: Aug. 30, 2018

(65) Prior Publication Data
US 2020/0055791 A1 Feb. 20, 2020

(30) Foreign Application Priority Data
Feb. 27, 2017 (EP) .................................. 17158113

(51) Int. Cl.
*C05G 5/12* (2020.01)
*C05G 5/30* (2020.01)
(Continued)

(52) U.S. Cl.
CPC .................. *C05D 9/02* (2013.01); *C05B 7/00* (2013.01); *C05C 1/02* (2013.01); *C05C 5/00* (2013.01);
(Continued)

(58) Field of Classification Search
None
See application file for complete search history.

(56) References Cited

U.S. PATENT DOCUMENTS 6,176,892 B1 * 1/2001 Obrestad ................... C05C 5/02
71/31
6,610,267 B1 * 8/2003 Obrestad ................... C05C 5/02
423/395
(Continued)

FOREIGN PATENT DOCUMENTS

| CN | 104211528 | 4/2016 |
| WO | 99/59938 | 11/1999 |

(Continued)

OTHER PUBLICATIONS

International Search Report dated Jun. 5, 2018 in International Application No. PCT/EP2018/054607.
(Continued)

*Primary Examiner* — Wayne A Langel
(74) *Attorney, Agent, or Firm* — Wenderoth, Lind & Ponack, L.L.P.

(57) ABSTRACT

The present disclosure concerns a method for producing fertilizer particles comprising an alternative source of boron. It is found that certain colemanite and ulexite powders can be supplied to a fertilizer melt shortly before granulation essentially without dissolving into the melt. Accordingly, the fertilizer particles produced from the melt may contain negligible amounts or non-detectable levels of sodium borates or boric acid. Furthermore, the fertilizer particles can be homogeneous which is desirable for boron supplying fertilizers. It is also found that the fertilizer particles can supply boron to plants at a rate comparable to borax pentahydrate.

8 Claims, 2 Drawing Sheets

(51) Int. Cl.
   *C05C 1/02*   (2006.01)
   *C05C 5/04*   (2006.01)
   *C05G 1/00*   (2006.01)
   *C05C 5/00*   (2006.01)
   *C08B 7/00*   (2006.01)
   *C05D 1/02*   (2006.01)
   *C05D 9/02*   (2006.01)
   *C05B 7/00*   (2006.01)

(52) U.S. Cl.
   CPC .............. *C05C 5/04* (2013.01); *C05D 1/02* (2013.01); *C05G 1/00* (2013.01); *C05G 5/12* (2020.02); *C05G 5/30* (2020.02)

(56) References Cited

U.S. PATENT DOCUMENTS

| | | | |
|---|---|---|---|
| 2010/0234223 A1* | 9/2010 | Pursell | C05G 5/40 504/101 |
| 2015/0376076 A1 | 12/2015 | Ward et al. | |
| 2018/0237356 A1* | 8/2018 | Cotrim | C05C 7/00 |

FOREIGN PATENT DOCUMENTS

| | | | | |
|---|---|---|---|---|
| WO | WO 99/59938 | * | 11/1999 | ............ C05B 19/00 |
| WO | 00/02831 | | 1/2000 | |
| WO | 01/21556 | | 3/2001 | |

OTHER PUBLICATIONS

Written Opinion of the International Searching Authority dated Jun. 5, 2018 in International Application No. PCT/EP2018/054607.
Saleem et al., "Boron fertilizers borax and colemanite application on rice and their residual effect on the following crop cycle", Soil Science and Plant Nurition, vol. 57, No. 3, Jun. 1, 2011, pp. 403-410, XP055400100.
Abat et al., "Boron phosphates (BP04) as a seedling-safe born fertilizer source", Plant and Soil, Kluwer Academic Publishers, NL, vol. 391, No. 1, Feb. 25, 2015, pp. 153-160, XP035500139.
K.A. Kelling, "Soil and Applied Boron", University of Wisconsin-Extension, 1999.
C.G. Sherrell, "Comparison of materials of different solubility as sources of boron for plants", New Zealand Journal of Experimental Agriculture, 11:4, 325-329, Jan. 30, 2012.
H. Marschner, "Mineral Nutrition of Higher Plants", Academic Press, 2nd Ed., Chapter 2, pp. 6-78, 1995.

* cited by examiner

METHOD FOR PRODUCING FERTILIZER PARTICLES COMPRISING ALTERNATIVE BORON SOURCES

FIELD

The present disclosure concerns a method for producing fertilizer particles comprising an alternative source of boron.

BACKGROUND

The primary mineral nutrients for plants are based on nitrogen (N), phosphorus (P) and potassium (K). They are mainly absorbed by plants in the form of ions, such as $NO_3^-$, $NH_4^+$, $HPO_4^{2-}$, $H_2PO_4^-$ and $K^+$. Accordingly, most inorganic fertilizers provide salts comprising some or all of the mentioned ions.

Fertilizers providing all the three primary mineral nutrients in an available form for the plants are often referred to as NPK fertilizers. Accordingly, pure ammonium nitrate is an N fertilizer while NP fertilizers comprise a nitrogen source and a phosphorous source available for plants. The nutrient content of NPK fertilizers is often declared as X-Y-Z wherein X value is the theoretical percentage of elemental nitrogen by weight in the fertilizer; Y is the phosphorous content corresponding to an imaginary weight fraction of $P_2O_5$ and Z is the potassium content corresponding to an imaginary weight fraction of $K_2O$.

Plants also need secondary mineral nutrients including boron. A narrow concentration window is suitable for avoiding boron deficiency and boron toxicity. Boron in soil solution is typically present as boric acid or borate. The pKa of boric acid is 9.25, thus the equilibrium is shifted greatly toward boric acid at neutral pH. Boric acid, a charge-neutral molecule, is the major chemical form of boron taken up by plants (Marschner H. 1995. Mineral nutrition of higher plants. second edition, Academic Press). The mobility of borates in plants is limited, thus a continuous supply from soil or planting media is required in all plant meristems.

There are hundreds of known borate minerals, for example aksaite, borax, colemanite, datolite, ezcurrite, fabianite, ginorite, hydroboracite, inyoite, jarandolite, kernite, larderellite, metaborite, nobleite, olshanskyite, preobrazhenskite, ramanite, strontioborite, tincal, ulexite, veatchite and walkerite.

Borax and sodium tetraborate are the most commonly used boron sources for fertilizers. Disodium octaborate, sodium pentaborate and boric acid are used occasionally for direct soil application or in foliar spray (Kelling et al, A2522 Soil and Applied Boron). These boron sources are water soluble. However, due to potential toxicity issues related to sodium borates and boric acid exposure during production, transport and handling of fertilizers, there is a need for alternative boron sources. Since 2009, boric acid and boric oxide have been included in the SVHC list (Substances of Very High Concern) of the European Chemical Agency because of repro-toxicity and there is the potential that sodium borates may be included in the SVHC list in the near future.

It is also known that borax and boric acid can be phytotoxic for germinating seeds and care should be taken not to exceed the recommended rate and to ensure uniform application (see Sherrell et al (1983) New Zealand Journal of Experimental Agriculture, 11:4, 325-329).

SUMMARY

The present disclosure concerns a method for producing fertilizer particles comprising an alternative source of boron.

It is found that colemanite and ulexite powders with a suitable particle size can be supplied to a fertilizer melt shortly before granulation essentially without dissolving into the melt. Accordingly, the fertilizer particles produced from the melt may contain negligible amounts or non-detectable levels of sodium borates or boric acid. Furthermore, the fertilizer particles can be homogeneous which is desirable for boron supplying fertilizers. It is also found that the fertilizer particles can supply boron to plants at a rate comparable to borax pentahydrate. Colemanite and ulexite are poorly water soluble minerals, and it was not expected that these powdered minerals would provide boron availability comparable to borax pentahydrate from fertilizer particles made by melt granulation.

In a first embodiment, a method for producing fertilizer particles is provided, comprising the steps of
  a) forming a fertilizer melt comprising a nitrate salt, wherein the nitrate salt is an NPK fertilizer melt or a calcium nitrate melt;
  b) adding a boron source in the form of colemanite or ulexite particles with a median particle size in the range 1 to 100 μm to the melt
  c) granulating fertilizer particles from the fertilizer melt.

In a first aspect of the first embodiment, the nitrogen source comprises ammonium nitrate.

In a second aspect of the first embodiment, the colemanite particles or the ulexite particles are in contact with the fertilizer melt for less than 100 seconds.

In a third aspect of the first embodiment, the melt is a NPK fertilizer melt and the water content of the melt is less than 3% w/w.

In a fourth aspect of the first embodiment, the colemanite particles or ulexite particles has a median particle size in the range of 1 to 100 μm, a D90 value of less than 100 μm and a D10 value of more than 1 μm.

In a fifth aspect of the first embodiment, the fertilizer melt comprises more than 70% w/w calcium nitrate and the water content of the melt is less than 20% w/w.

In a sixth aspect of the first embodiment, the temperature of the melt is in the range of 100 to 180° C. at the time of addition of the colemanite particles or the ulexite particles.

In a seventh aspect of the first embodiment, the granulated particles are subsequently coated.

In a second embodiment, particles produced according the method in the first embodiment are provided.

DETAILED DESCRIPTION

Figure 1:
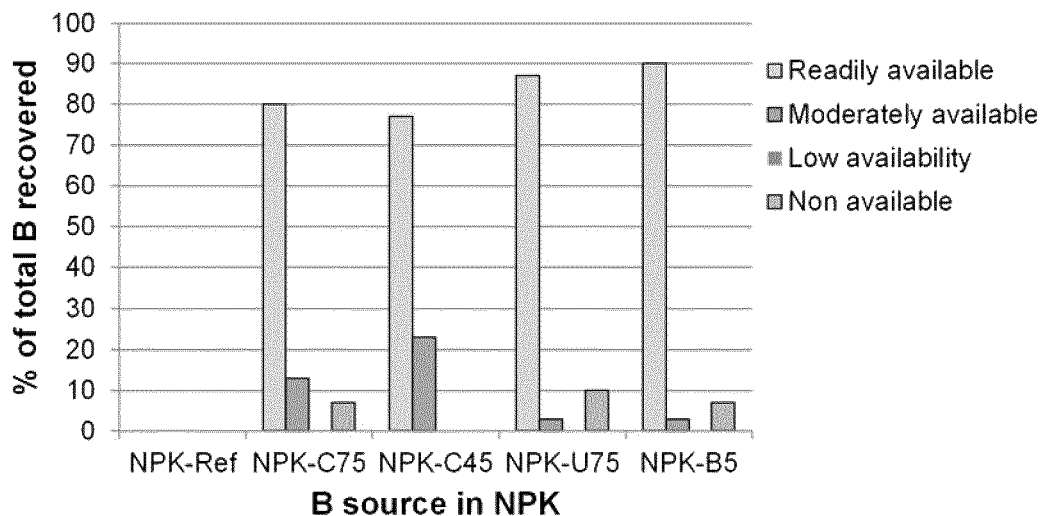
FIG. 1 shows the boron availability from 5 different NPK fertilizer compositions.

The present disclosure concerns novel fertilizer particles, which can be produced by melt granulation. Melt granulation is the most commonly used industrial process for production of fertilizer particles. Melt granulation often includes a step involving heating of an aqueous mixture comprising fertilizer salts to generate a fertilizer melt. Optionally, the fertilizer melt may be generated from the exothermic neutralization of mineral acids with ammonia. As used herein, a fertilizer melt is a fluid comprising completely and/or partly dissolved or molten fertilizer salts comprising a low water content. Accordingly, the fertilizer melt may be solid at ambient temperature, but liquid at increased temperatures. Water may be evaporated from the fertilizer melt before a drop generation step. The drop generation step can involve spraying of the fertilizer melt through nozzles. The liquid drops can then be solidified by various well known methods. For example, prilling is one type of melt granulation process, which can produce reasonably uniform spherical particles by solidifying the drops as they fall through a cooling fluid. Other examples of melt granulation processes include spherodization, pan granulation, drum granulation and cooling belt technology. For melt granulation processes, it is beneficial to generate a composition with a melting point at a fairly low temperature, but significantly higher than ambient temperature. Then, solidification of particles from the fertilizer melt may be facilitated by cooling via ambient air.

One advantage of melt granulation processes is that they can produce homogeneous fertilizer particles. Homogeneous fertilizer particles, as used herein, means that the particles are essentially uniform with respect to their nutrient composition throughout the particles. Homogeneous fertilizer particles can be produced by melt granulation of a homogeneous fertilizer melt. A homogeneous fertilizer melt, as used herein, means that the fertilizer melt is essentially uniform with respect to its composition, however, the homogeneous fertilizer melt may contain some solid particles with those solid particles being uniformly dispersed throughout the fertilizer melt. If the homogeneous melt comprises solid particles, it can also be considered to be a slurry.

NPK particles provide the three primary mineral nutrients in an available form for the plants. When producing NPK particles by melt granulation, it is common to add potassium salt in the form of a powder to an NP melt. Some potassium salts like KCl and $K_2SO_4$ may not dissolve or dissolve only partly into the melt depending on the composition, temperature and water content. It is also possible to add potassium in the form of an aqueous solution comprising a dissolved potassium salt. When fertilizer particles are granulated from a homogeneous fertilizer melt, the nutrient composition throughout the particles is also essentially homogeneous. Homogeneous fertilizer particles are generally preferred over heterogeneous particles and heterogeneous blends because they allow a more uniform and reliable release of the nutrients. This is especially important for fertilizers supplying boron, which may be phytotoxic at high concentration levels.

It has been found that when boron containing minerals are dissolved in a fertilizer melt, there is a substantial risk that sodium borates or boric acid will be formed. For example, based on experimental data (not presented), it has been realized that the prior art process described in WO9959938A1 results in the formation of substantial amounts of boric acid. However, sodium borates and boric acid may also present potential toxicity issues related to human exposure during production, transport and handling of fertilizers. Accordingly, there is a need for alternative boron sources, which can be used in homogeneous fertilizer particles and it is desirable that such alternative boron sources do not form sodium borates or boric acid during the production process. As used herein, "sodium borates" is meant to cover the water soluble borates and their hydrates comprising sodium as the only cation. Accordingly, "sodium borates" covers anhydrous borax, borax pentahydrate, borax decahydrate, tincal, tincalonite and kernite.

It has been found that particle size is a key parameter that needs to be carefully controlled. For example, a relatively small particle size of a boron containing mineral powder may increase the risk of dissolution in the melt and formation sodium borates or boric acid. On the other hand, a relatively large particle size of a boron containing mineral powder may increase the risk of low boron availability for plants. Sodium borates for fertilizer use is conventionally supplied as a coarse powder with a median particle size around 500 μm.

It has been found that certain colemanite and ulexite powders can be supplied to a fertilizer melt comprising nitrate salts shortly before granulation essentially without dissolving into the melt while still being able to provide boron to plants at a high rate. The boron-containing mineral colemanite is naturally occurring with a chemical composition that can be represented by $Ca_2B_6O_{11}.5H_2O$. The boron-containing mineral ulexite is naturally occurring with a chemical composition that can be represented by $NaCaB_5O_9.8H_2O$. Accordingly, the obtained fertilizer particles may contain particles of a naturally occurring mineral, while at same time, the fertilizer particles may contain negligible amounts of sodium borates and boric acid. Negligible amounts in a fertilizer particle would mean less than 0.1% w/w of boron in the form of sodium borates or boric acid. In particular, negligible amounts may be less than 0.05% w/w of boron in the form of sodium borates or boric acid. In particular, negligible amounts may be less than 0.01% w/w of boron in the form of sodium borates or boric acid. In particular, negligible amounts may be non-detectable levels of boron in the form of sodium borates or boric acid.

Suitable colemanite powders and ulexite powders have a median particle size in the range of 1 to 100 μm. More specifically, such powders may have a median particle size in the range of 5 to 90 μm. More specifically, such powders may have a median particle size in the range of 10 to 40 μm. It is particularly desirable that the obtained fertilizer particles are homogeneous with respect to the boron source. In addition, it is particularly desirable that milled borates are used. As defined herein, milled borates are non crystalline borates that have a size under 100 μm. Accordingly, the suitable colemanite powder or ulexite powder may have a median particle size in the range of 1 to 100 μm, a D90 value of less than 100 μm and a D10 value of more than 1 μm. D90 means that 90% of the particles have size below the value as measured by laser diffraction analysis. D10 means that 10% of the particles have size below the value as measured by laser diffraction analysis.

Without being bound by theory, the high availability of boron from colemanite powders and ulexite powders in a fertilizer particle made by melt granulation may be due to reduction of the activity coefficient of the borate ion in the salt matrix. In this respect, it has been found that the presence of a nitrate such as ammonium nitrate contributes to boron availability from colemanite. Notably, both the tested NPK particles and the calcium nitrate particles contained ammonium nitrate. Colemanite particles are known in connection with urea fertilizers as disclosed in WO2001021556 (Kemira), but urea is not considered compatible with ammonium nitrate.

Fertilizer particles made by melt granulation wherein a colemanite powder or ulexite powder is added shortly before the granulation step, are assumed to comprise the colemanite particles or ulexite particles from the respective powders. Accordingly, the median particle size of the colemanite powder or the ulexite powder can most conveniently be measured before addition to the fertilizer melt. As used herein, the median particle size of the powder particles is the median volume based value (D50) that can be conveniently obtained with conventional laser diffraction techniques relying on their pertaining assumptions.

In order to determine the median particle size of colemanite or ulexite in fertilizer particles it is possible to dissolve a fertilizer particle in cold water (e.g. 2 to 8° C.) and examine the insoluble particles by well-known methods. The insoluble particles may for example be dried and fractionated according to particle size or particle density before the fractions are analyzed by x-ray diffraction, raman spectroscopy, scanning electron microscopy etc. (see Frost et al Journal of Molecular Structure 1037 (2013) 23-28 and Celik & Cakal, Physicochem. Probl. Miner. Process. 52(1), 2016, 66-76, Allen et al 1849, Geological survey bulletin 1036-k). By such methods, the fractions comprising colemanite or ulexite particles may be identified for example by x-ray diffraction, the colemanite or the ulexite particles can be separated and the median particle size may be obtained by conventional laser diffraction techniques.

It has also been found that in preferred embodiments, the water content of the fertilizer melts subject to granulation should be low before the addition of the colemanite powder or ulexite powder. Without being bound by theory, excess water in the melt can lead to formation of boric acid. In some more particular embodiments, the water content of the NPK fertilizer melts before the addition of the colemanite powder or ulexite powder may be within the range 0 to 4% w/w. More particularly, the water content of the NPK fertilizer melts before the addition of the colemanite powder or ulexite powder may be within the range 0.5 to 3% w/w. In particular, the water content of calcium nitrate fertilizer melts before the addition of the colemanite powder or ulexite powder may be within the range 0 to 20% w/w. More particularly, the water content of the calcium nitrate fertilizer melts before the addition of colemanite powder or ulexite powder may be within the range 3 to 18% w/w. As discussed below, calcium nitrate typically is hydrated. Without being bound by theory, the higher amounts of water tolerated in calcium nitrate melts compared to NPK fertilizer melts is due to the water being bound with the calcium nitrate and not being free water.

An additional parameter that can affect the dissolution of colemanite powder or ulexite powder is the contact time with the fertilizer melts subject to granulation. It has been found that having relatively short contact times reduces the likelihood of colemanite powder or ulexite powder dissolving in the melt. In particular, the colemanite powder or ulexite powder may be added shortly before the granulation. In this context, the contact time is the time between addition of the colemanite powder or ulexite powder to the melt and when the fertilizer melt is granulated to form solid fertilizer particles. The amount of time can vary depending on the nature of the fertilizer. In particular, the contact time may be the time required to homogenize the melt after addition of the powder. In this manner, a homogeneous melt can be achieved with no conversion of colemanite and ulexite to toxic boric acid and borates species upon a prolonged contact time after the melt has been made homogeneous. Accordingly, the precise suitable point in time for adding the colemanite powder or ulexite powder before granulation may vary to some extent. For example, it has been observed that colemanite or ulexite particles can be in contact with an NPK fertilizer melt for less than 100 seconds. In particular, the contact time with an NPK fertilizer is between 50 and 95 seconds, more in particular between 80 and 95 seconds and even more in particular between 85 and 95 seconds. In comparison, ulexite particles can be in contact with a calcium nitrate fertilizer melt for less than 600 seconds. In particular, the contact time of ulexite particles with a calcium nitrate fertilizer melt is between 400 and 580 seconds, more in particular between 500 and 580 seconds and even more in particular between 550 and 580 seconds.

It has also been found that a melt granulation process combining low water content of the fertilizer melt with short contact time of the colemanite powder or ulexite powder may provide nitrate based fertilizer particles without significant levels of sodium borates or boric acid, which still are able to provide boron to plants at a sufficient, uniform and reliable rate. Both low water content and short contact time are as defined above and depend on the nature of the fertilizer. This can be achieved by addition of a colemanite or ulexite powder with a median particle size in the range of 1 to 100 µm to a fertilizer melt comprising low levels of water shortly before granulation. The fertilizer melt may be an NPK fertilizer melt or a calcium nitrate melt. More specifically, this can be achieved by addition of a colemanite or ulexite powder with a median particle size in the range of 10 to 40 µm to an NPK fertilizer melt comprising low levels of water shortly before granulation. Alternatively, this can be achieved by addition of a colemanite or ulexite powder with a median particle size in the range of 10 to 40 µm to a calcium nitrate fertilizer melt comprising low levels of water shortly before granulation.

As used herein, an NPK fertilizer melt, is a fertilizer melt comprising substantial levels of the primary mineral nutrients for plants based on nitrogen (N), phosphorus (P) and potassium (K). Accordingly, the major ingredients of an NPK fertilizer melt may be nitrate salts, phosphate salts and potassium salts. For example, an NPK fertilizer melt may contain 25 to 50% ammonium nitrate, 5 to 30% w/w ammonium phosphate and 5 to 30% w/w potassium chloride. For example, an NPK fertilizer melt may comprise 30 to 50% w/w ammonium nitrate, 30 to 40% w/w phosphate salts, 5 to 25% w/w of potassium chloride. From NPK fertilizer melts NPK particles can be made. NPK particles, as used herein, are fertilizer particles comprising the primary mineral nutrient content (NPK) of 03-05-05 or more (according to the X-Y-Z terminology as mentioned). Depending on the crop's needs, common NPK particles may for example have a nutrient content of 15-15-15, 16-16-16, 13-13-21, 20-05-10, 15-09-20, 27-05-05 etc.

As used herein, an NP fertilizer melt, is a fertilizer melt comprising substantial levels of the primary mineral nutrients for plants based on nitrogen (N) and phosphorus (P). Accordingly, the major ingredients of an NP fertilizer melt may be nitrate salts and phosphate salts.

Urea is a common nitrogen source for fertilizers. Hydrolysis of urea results in a short-term alkalization in the immediate vicinity of the urea fertilizer particle when applied on the field. The higher pH results in ammonia losses especially when urea particles are applied as a top dressing on porous and dry soil. The life cycle carbon footprint of urea fertilizers is higher than that of fertilizers based on nitrate salts as the N source. It is therefore an environmental advantage to provide fertilizer particles wherein the nitrogen source is based on ammonium and/or nitrates instead of urea. Accordingly, the nitrogen source of the fertilizer particles herein may be any non-toxic nitrate salt. Ammonium nitrate is particularly suitable because it provides nitrogen available for the plants from both the cation and the anion. Calcium nitrate is also particularly suitable because calcium is a desired secondary nutrient and the salt can have benefits for acidic soils.

As used herein, a calcium nitrate melt is a fertilizer melt comprising substantial levels of calcium nitrate. Accordingly, the major ingredient in a calcium nitrate melt may be calcium nitrate, for example 60 to 90% w/w of calcium nitrate. As used herein, calcium nitrate is the salt $Ca(NO_3)_2$ which may or may not be hydrated. Accordingly, calcium nitrate can be anhydrous $Ca(NO_3)_2$ or hydrates like $Ca(NO_3)_2.2H_2O$, $Ca(NO_3)_2.3H_2O$ and $Ca(NO_3)_2.4H_2O$. However, as used herein, when referring to X % w/w of calcium nitrate, we refer to the relative weight of calcium nitrate as if it was present in anhydrous form, irrespective of the actual degree of hydration. Thus, fertilizer particles comprising calcium nitrate will usually also comprise water as hydrates. Accordingly, fertilizer particles comprising for example 95% w/w of calcium nitrate could also comprise 5% w/w of water. Notably, the melting point of pure anhydrous calcium nitrate is 561° C., while the calcium nitrate tetrahydrate melting point is 42.7° C. Due to the low melting point, pure calcium nitrate tetrahydrate fertilizer particles are difficult to produce by conventional melt granulation techniques, but the presence of ammonium nitrate in the calcium nitrate melt is well-known to improve solidification properties (see WO200002831).

According to the present disclosure, the phosphate salt can be any non-toxic phosphate salt providing phosphate ions to the plants. Such salts include, but are not limited to $NH_4H_2PO_4$, $(NH_4)_2HPO_4$, $CaHPO_4$, $Ca(H_2PO_4)_2$ and $Ca_3(PO_4)_2$. The term ammonium phosphates includes $NH_4H_2PO_4$ and $(NH_4)_2HPO_4$. Methods for measuring the amount of phosphate salts in fertilizer particles are well known to a skilled person, for example as disclosed in "Evaluation of Commonly Used Methods for the Analysis of Acid-Soluble Phosphate in Internationally Traded Inorganic Fertilizers" by The International Fertilizer Industry Association June 2014 or Testing Methods for Fertilizers" (2013) by the Japanese Incorporated Administrative Agency for Food and Agricultural Materials Inspection Center.

It also known that colemanite can react with aqueous ammonium sulfate solutions to form gypsum and boric acid (Tunç, M., Kocakerim, M., Küçük, Ö. et al. Korean J. Chem. Eng. (2007) 24: 55). In WO9959938A1 (Kemira) a sulfate based NPK fertilizer was made. During the process, colemanite mineral was fed into a reactor together with potassium sulfate, sodium sulfate, magnesium sulfate and manganese sulfate and subsequently the solution was neutralized with ammonia to a pH value of 6.0. The temperature before the granulation was 133° C. and the water content was 6.9%. Neither the colemanite particle size nor its contact time was disclosed.

According to the present disclosure, the potassium salts can be any non-toxic potassium salt providing potassium ions to the plants. However, it is beneficial that the fertilizer melt and the fertilizer particles comprise little or no sulfate, as it may contribute to dissolving colemanite or ulexite. Thus, in one aspect, the fertilizer melts comprising colemanite or ulexite may not contain substantial amounts of sulfate. Accordingly, in some embodiments, the fertilizer particles obtained from such fertilizer melts, may not contain substantial amounts of sulfate salts. For example, the fertilizer particles may comprise less than 1.0% w/w of sulfate salts or less than 0.5% w/w of sulfate salts.

Methods for measuring the amount of potassium salts or potassium chloride in a fertilizer particle are well known to a skilled person, for example as disclosed in "Testing Methods for Fertilizers" (2013) by the Japanese Incorporated Administrative Agency for Food and Agricultural Materials Inspection Center.

The homogeneous fertilizer particles according to the present disclosure may be applied to fields by spreading machines. For efficient distribution by conventional machines, a median diameter in the range of 1 to 10 mm can be suitable. It is particularly beneficial that more than 50% of the volume of the fertilizer particles have a diameter in the range of 2 to 5 mm. Some plants are known for their high demand of boron during growth, thus in one aspect of the present disclosure, the fertilizer particles may be used for fertilizing crops selected from alfalfa, barley, canola, cauliflower, corn, coffee, rice, soybean and wheat. In one aspect of the present disclosure, the fertilizer particles may be used for fertilizing crops selected from canola and cauliflower.

When Sherrel et al (1983), examined alternative boron sources for slow release of boron to plants by applying powders directly, it was found that " . . . datolite appears to be a useful alternative B source. Colemanite, although less soluble, appears to be very similar to the highly soluble compounds in current use whereas B availability in datolite is lower and this material should remain effective longer. Also, because of the lower initial availability it may be possible to apply a higher rate of datolite, without causing injury, and therefore maybe increase the time datolite remains effective". However, if applying boron minerals to fertilizer melts for making N fertilizer particles, it has to be taken into account that they may dissolve or react with the melt. It was already known that colemanite is soluble in mineral acids and other aqueous solutions. Particle size, temperature, pH and other parameters can affect the dissolution. For example, a small colemanite particle size would increase the likelihood of dissolution in fertilizer melts, which may be aqueous, acidic and heated.

The homogeneous fertilizer particles in the present disclosure can, if desired, be coated with conventional technologies to further improve their robustness or to provide specific nutrients. If coated by conventional technologies without plant nutrients present in the coating, the fertilizer particle will remain homogeneous. By coating of the homogeneous fertilizer particles according to the present disclosure, it is however also possible, if desired, to obtain heterogeneous particles.

As used herein, % w/w means the weight percentage. Accordingly, X % w/w of an ingredient in a fertilizer particle means that the ingredient is present in X weight percentage relative to the total weight of the particle. Accordingly, X % w/w of an ingredient in a fertilizer melt means that the ingredient is present in X weight percentage relative to the total weight of the melt.

As used herein, "about X" means any measured or calculated value, which would be rounded to X.

As used herein, the boron content is calculated as the relative weight percentage of the element boron (B) irrespective of the actual boron source. Commercial fertilizers providing boron usually have a boron (B) content in the range of 0.01 to 0.5% w/w. Accordingly, if the boron source used is borax pentahydrate, the weight percentage of borax pentahydrate would be in the range of 0.07 to 3.4% w/w.

It is understood that the ingredients of fertilizer particles and fertilizer melts in this disclosure will constitute 100%. Accordingly, a fertilizer comprising 80% w/w calcium nitrate and 5% w/w ammonium nitrate will contain 15% w/w other ingredients (e.g. crystal water).

Methods for measuring the amount of fertilizer salts in a fertilizer particle are well known to the skilled person, for example as disclosed in "Testing Methods for Fertilizers" (2013) by the Japanese Incorporated Administrative Agency for Food and Agricultural Materials Inspection Center or "Methods of sampling and test for fertilizers" (1985) by Bhavan et al; Indian standard IS:6092 (Part 6).

The present invention is defined by the claims and not by the following examples:

EXAMPLES

Boron was analyzed according to EU Method 9.5: "Determination of boron in fertilizer extracts by means of spectrometry with azomethine-H" in the "Regulation (EC) No 2003/2003 of The European Parliament and of The Council of 13 Oct. 2003 relating to fertilizers".

Water soluble boron was analyzed by dissolving the sample in water, bringing the solution to its boiling point and then stir for 30 minutes before analysis.

Acid soluble boron was analyzed by dissolving the sample in 4 M hydrochloric acid for 10 minutes at room temperature before analysis.

The boron sources in the following examples were commercially available powders from Eti Maden with the following particle size in μm:

|  | D10 | D50 | D90 | D99 |
|---|---|---|---|---|
| Col-75 | 3.05 | 22 | 68 | 115 |
| Col-45 | 2.5 | 19 | 55 | 87 |
| Ule-75 | 2.3 | 15.7 | 81 | 168 |
| Ule-45 | 1.9 | 12.3 | 54 | 98 |
| Borax pentahydrate powder | 258 | 641 | 1297 | 1822 |

As mentioned above, the median particle size is represented by the D50-value obtained by laser diffraction analysis.

Example 1

NPK Fertilizer Comprising Alternative Boron Source

An NPK fertilizer (16-16-16) comprising ammonium nitrate, ammonium phosphates and potassium chloride was produced by the nitrophosphate (Odda) process. The NPK fertilizer (16-16-16) was mixed with ammonium nitrate crystals and dolomite to give an NPK fertilizer (19-12-12).

Water (2.5% w/w) was added to the NPK fertilizer (19-12-12). The mixture was mixed, heated and melted under continuous gentle agitation. At 150° C., a borate source was added to the molten homogenized mixture and mixed for 30 seconds. The borate source was borax pentahydrate powder, colemanite powder or ulexite powder. The melt was poured on a steel plate and solidified into a NPK block. The block was placed in an airtight plastic bag and cooled at 0° C. for minimum 2 hours for complete solidification. The block was crushed to maximum particle size approximately 1 cm. The sample was divided into smaller samples using a sample divider. The samples were kept in airtight containers until analyses.

TABLE 1

| Product | Ratio water solubility/acid solubility of borate |
|---|---|
| NPK 19-12-12 + 0.3% w/w boron in the form of borax pentahydrate powder | 102% |
| NPK 19-12-12 + 0.3% w/w boron in the form of colemanite powder (Col-45) | 102% |
| NPK 19-12-12 + 0.3% w/w boron in the form of colemanite powder (Col-75) | 98% |
| NPK 19-12-12 + 0.3% w/w boron in the form of ulexite powder (Ule-75) | 100% |

As can be seen from Table 1, NPK fertilizers comprising colemanite or ulexite powder can provide a source of water soluble borates comparable to borax pentahydrate. It is noted that all the tested boron sources were fully acid soluble.

Example 2

N-Fertilizer Comprising Alternative Boron Source

A calcium nitrate fertilizer comprising 77-78% w/w $Ca(NO_3)_2$, 6-7% w/w $NH_4NO_3$ and 15-16% w/w crystal water was produced in a Yara plant as described below.

Calcium nitrate granules and 1% w/w water (and filler for the reference sample) was mixed.

The mixture was heated and melted under continuous gentle agitation.

When the temperature had reached 110° C., the borate was added to the molten homogenized mixture.

Borax pentahydrate powder, colemanite powder or ulexite powder was mixed with calcium nitrate melt for 5 minutes.

The melt was poured on a steel plate.

The melt solidified into a calcium nitrate block.

The block was placed in an airtight plastic bag and cooled at 0° C. for minimum 2 hours for complete solidification.

The block was crushed to maximum particle size approximately 1 cm.

The sample was divided into smaller samples using a sample divider.

The samples were kept in airtight containers until analyses.

Table 2 shows the ratio between water solubility and acid solubility of borates from the different boron sources added to a calcium nitrate fertilizer.

TABLE 2

| Product | Ratio water solubility/acid solubility of borate |
|---|---|
| Calcium nitrate + 0.3% w/w boron in the form of borax pentahydrate powder | 102% |
| Calcium nitrate + 0.3% w/w boron in the form of colemanite powder (Col-45) | 66% |
| Calcium nitrate + 0.3% w/w boron in the form of colemanite powder (Col-75) | 63% |
| Calcium nitrate + 0.3% w/w boron in the form of ulexite powder (Ule-75) | 91% |

As can be seen from table 2, calcium nitrate fertilizers comprising ulexite powder provide a source of water soluble boron comparable to the borax pentahydrate powder, while calcium nitrate fertilizers comprising colemanite powder provide less water soluble boron compared to borax pentahydrate powder. It is noted that all the tested boron sources were fully acid soluble.

Example 3

Selective Extraction of Boron from NPK Fertilizers

NPK fertilizer particles were produced as disclosed in Example 1. The availability of boron from these compositions was analyzed as boron solubility in different solvents at room temperature:
Readily available: Soluble in water
Moderately available: Soluble in 2% neutral ammonium citrate solution
Low availability: Soluble in 2% citric acid
Non available: Not soluble in water nor citrate
This selective extraction method is based on EU Method 3.1 "Phosphorous—Extractions" in the "Regulation (EC) No 2003/2003 of The European Parliament and of The Council of 13 Oct. 2003 relating to fertilizers", where the method is modified to be applied to boron analyses instead of phosphorous analyses. The results are presented in FIG. 1 where NPK-ref is the control composition without a boron source. NPK-C75 is a NPK fertilizer comprising colemanite powder (Col-75). NPK-C45 is a NPK fertilizer comprising colemanite powder (Col-45). NPK-U75 is a NPK fertilizer comprising ulexite powder (Ule-75). NPK-B5 is a NPK fertilizer comprising borax. As can be seen from the results, most of the boron from the NPK fertilizers comprising colemanite or ulexite were readily or moderately available.

Example 4

Selective Extraction of Boron from Calcium Nitrate Fertilizers

Figure 2:
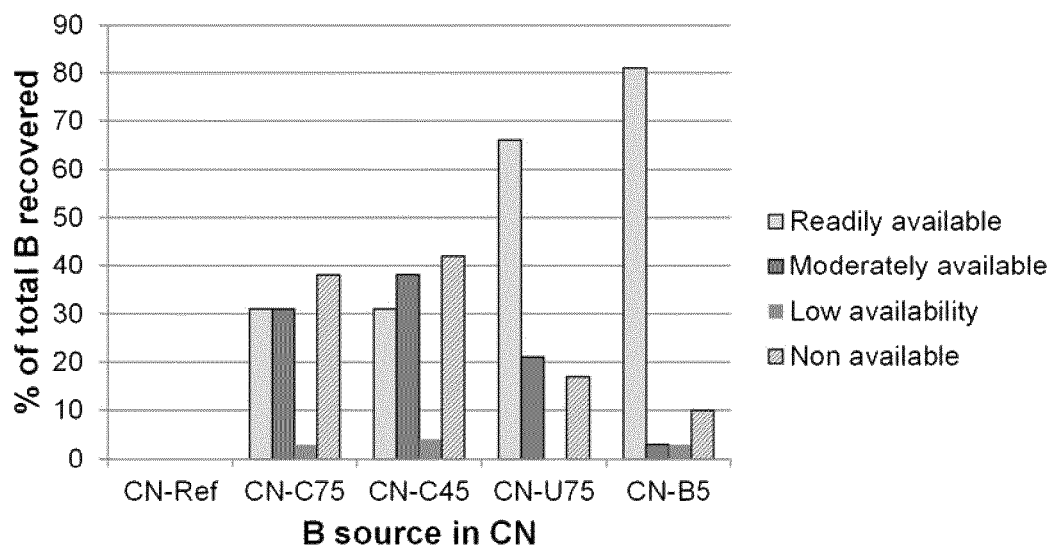
FIG. 2 shows the boron availability from 5 different calcium nitrate fertilizer compositions.

Calcium nitrate fertilizer particles were produced as disclosed in Example 2. The availability of boron from these compositions was analyzed as boron solubility in different solvents at room temperature:
Readily available: Soluble in water
Moderately available: Soluble in 2% neutral ammonium citrate solution
Low availability: Soluble in 2% citric acid
Non available: Not soluble in water nor citrate
This selective extraction method is based on EU Method 3.1 "Phosphorous—Extractions" in the "Regulation (EC) No 2003/2003 of The European Parliament and of The Council of 13 Oct. 2003 relating to fertilisers", where the method is modified to be applied to boron analyses instead of phosphorous analyses. The results are presented in FIG. 2 where CN-ref is the control composition without a boron source. CN-C75 is a calcium nitrate-fertilizer comprising colemanite powder (Col-75). CN-C45 is a calcium nitrate-fertilizer comprising colemanite powder (Col-45). CN-U75 is a calcium nitrate-fertilizer comprising ulexite powder (Ule-75). CN-B5 is a calcium nitrate-fertilizer comprising borax pentahydrate powder. As can be seen from the results, most of the boron from the calcium nitrate fertilizer comprising ulexite were readily or moderately available.

Example 5

Boron Uptake in Canola

Figure 3:
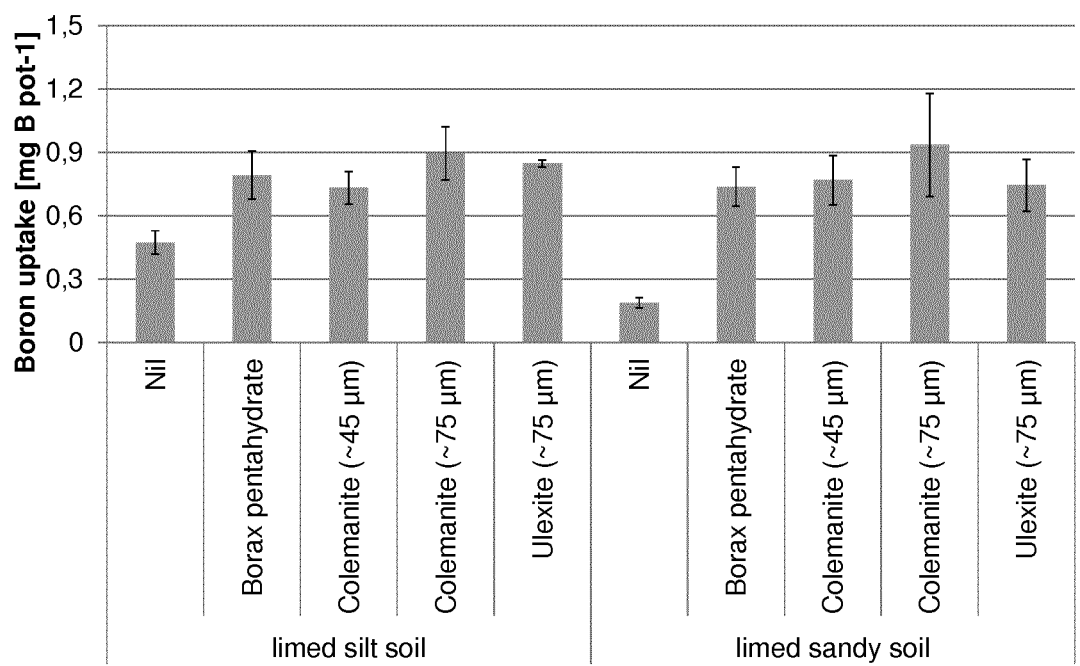
FIG. 3 shows the boron content of Canola plants after 21 days.

NPK particles produced according to example 1 were applied on limed silty soil and on limed sandy soil growing Canola (oil seed rape). The plants were harvested after 21 days and the boron uptake was analyzed. NPK particles without boron source were used as control. The boron sources were borax pentahydrate powder, colemanite (−45 µm) which is Col-45, colemanite (75 µm) which is Col-75 and ulexite (−75 µm) which is Ule-75. As can be seen from the results in FIG. 3, NPK particles comprising colemanite and ulexite powders were able to supply boron to Canola plants at a comparable level/rate as borax pentahydrate. Canola plants are known for high demand of boron during growth, and this experiment confirms sufficient boron uptake for the tested boron-containing samples.

The invention claimed is:

1. Method for producing fertilizer particles comprising the steps of
    a) forming a fertilizer melt comprising a nitrate salt wherein the fertilizer melt is an NPK melt or a calcium nitrate melt;
    b) adding a boron source in the form of colemanite or ulexite particles with a median particle size in the range 1 to 100 µm to the melt in such a way
        that the colemanite particles or the ulexite particles are in contact with the fertilizer melt for less than 100 seconds if said fertilizer melt is an NPK melt or
        that the colemanite particles or the ulexite particles are in contact with the fertilizer melt for less than 600 seconds if said fertilizer melt is a calcium nitrate melt
    c) granulating homogeneous fertilizer particles from the produced homogeneous fertilizer melt of step b).

2. A method according to claim 1 wherein the nitrate salt is ammonium nitrate.

3. A method according to claim 1 wherein the melt is a NPK fertilizer melt and the water content of the melt is less than 3% w/w.

4. A method according to claim 1 wherein the fertilizer melt comprises more than 70% w/w calcium nitrate and the water content of the melt is less than 20% w/w.

5. A method according to claim 1 wherein the temperature of the melt is in the range of 100 to 180° C. at the time of addition of the colemanite particles or the ulexite particles.

6. A method according to claim 5 further comprising the step of coating the granulated particles.

7. A particle produced by the method according to claim 1.

8. A particle according to claim 7 comprising less than 0.1% w/w of boron in the form of sodium borates or boric acid.

* * * * *